US010766334B2

(12) United States Patent
Hengstenberg et al.

(10) Patent No.: US 10,766,334 B2
(45) Date of Patent: Sep. 8, 2020

(54) METHOD AND DEVICE FOR OPERATING A MULTI-CHANNEL DEVICE AND TRANSPORTATION VEHICLE AND COMPUTER PROGRAM

(71) Applicant: VOLKSWAGEN AG, Wolfsburg (DE)

(72) Inventors: Oliver Hengstenberg, Märkisch Buchholz (DE); Jens Baumgarten, Berlin (DE); Jörn Michaelis, Berlin (DE)

(73) Assignee: Volkswagen AG, Wolfsburg (DE)

( * ) Notice: Subject to any disclaimer, the term of this patent is extended or adjusted under 35 U.S.C. 154(b) by 182 days.

(21) Appl. No.: 16/100,275

(22) Filed: Aug. 10, 2018

(65) Prior Publication Data
US 2019/0061461 A1  Feb. 28, 2019

(30) Foreign Application Priority Data

Aug. 23, 2017  (DE) .......................... 10 2017 214 735

(51) Int. Cl.
*B60H 1/00* (2006.01)
*B60K 35/00* (2006.01)
(Continued)

(52) U.S. Cl.
CPC ....... *B60H 1/00064* (2013.01); *B60H 1/0005* (2013.01); *B60H 1/00028* (2013.01);
(Continued)

(58) Field of Classification Search
USPC .......................................................... 701/36
See application file for complete search history.

(56) References Cited

U.S. PATENT DOCUMENTS

2008/0231615 A1* 9/2008 Tanaka .................. B60K 37/06
345/184
2014/0067201 A1* 3/2014 Visintainer ......... B60R 16/0373
701/36
(Continued)

FOREIGN PATENT DOCUMENTS

DE   102004056813 A1   8/2005
DE   102014003947 A1   9/2015
(Continued)

OTHER PUBLICATIONS

Search Report for German Patent Application No. 10 2017 214 735.0; dated May 3, 2018.

*Primary Examiner* — Tyler D Paige
(74) *Attorney, Agent, or Firm* — Barnes & Thornburg LLP

(57) ABSTRACT

A method and a device for operating a multi-channel device wherein common control of an adjustment parameter is carried out in different zones in a synchronization mode. In another operating mode, the zones are controlled separately according to the individually adjusted adjustment parameters. There are at least a first parameter adjuster and a second parameter adjuster for setting the parameters for the at least two zones. The individual operating mode, on further actuating the second parameter adjuster so the selected parameter is brought into agreement with the parameter value selected by the first parameter adjuster, the second operating mode is exited and the at least two different zones are again controlled in common in the first operating mode.

22 Claims, 4 Drawing Sheets

(51) Int. Cl.
  *B60R 16/02*   (2006.01)
  *B60K 37/06*   (2006.01)
  *B60W 50/08*   (2020.01)

(52) U.S. Cl.
  CPC ....... *B60H 1/0065* (2013.01); *B60H 1/00971* (2013.01); *B60H 1/00985* (2013.01); *B60K 35/00* (2013.01); *B60K 37/06* (2013.01); *B60W 50/085* (2013.01); *B60H 2001/00185* (2013.01); *B60K 2370/139* (2019.05); *B60K 2370/1446* (2019.05)

(56) References Cited

U.S. PATENT DOCUMENTS

| | | | | |
|---|---|---|---|---|
| 2014/0303835 | A1* | 10/2014 | VerWoert | B60H 1/00742 701/36 |
| 2016/0347151 | A1* | 12/2016 | Arakawa | G06F 3/04847 |
| 2018/0312031 | A1* | 11/2018 | Baker | B60H 1/00742 |
| 2019/0061461 | A1* | 2/2019 | Hengstenberg | B60H 1/0005 |
| 2019/0184788 | A1* | 6/2019 | Stachewicz | B60H 1/00742 |

FOREIGN PATENT DOCUMENTS

| | | |
|---|---|---|
| EP | 1486362 A2 | 12/2004 |
| EP | 2164252 A1 | 3/2010 |
| JP | 2005136704 A | 5/2005 |
| KR | 20160105590 A | 9/2016 |

* cited by examiner

METHOD AND DEVICE FOR OPERATING A MULTI-CHANNEL DEVICE AND TRANSPORTATION VEHICLE AND COMPUTER PROGRAM

PRIORITY CLAIM

This patent application claims priority to German Patent Application No. 10 2017 214 735.0, filed 23 Aug. 2017, the disclosure of which is incorporated herein by reference in its entirety.

SUMMARY

The disclosure concerns the technical field of so-called user interfaces. Illustrative embodiments provide a method and a device for operating a multi-channel device. Illustrative embodiments also provide a computer program and a transportation vehicle comprising the disclosed device.

BRIEF DESCRIPTION OF THE DRAWINGS

The disclosed embodiments are explained in more detail below with reference to the figures, in which.

DETAILED DESCRIPTION

Figure 1:
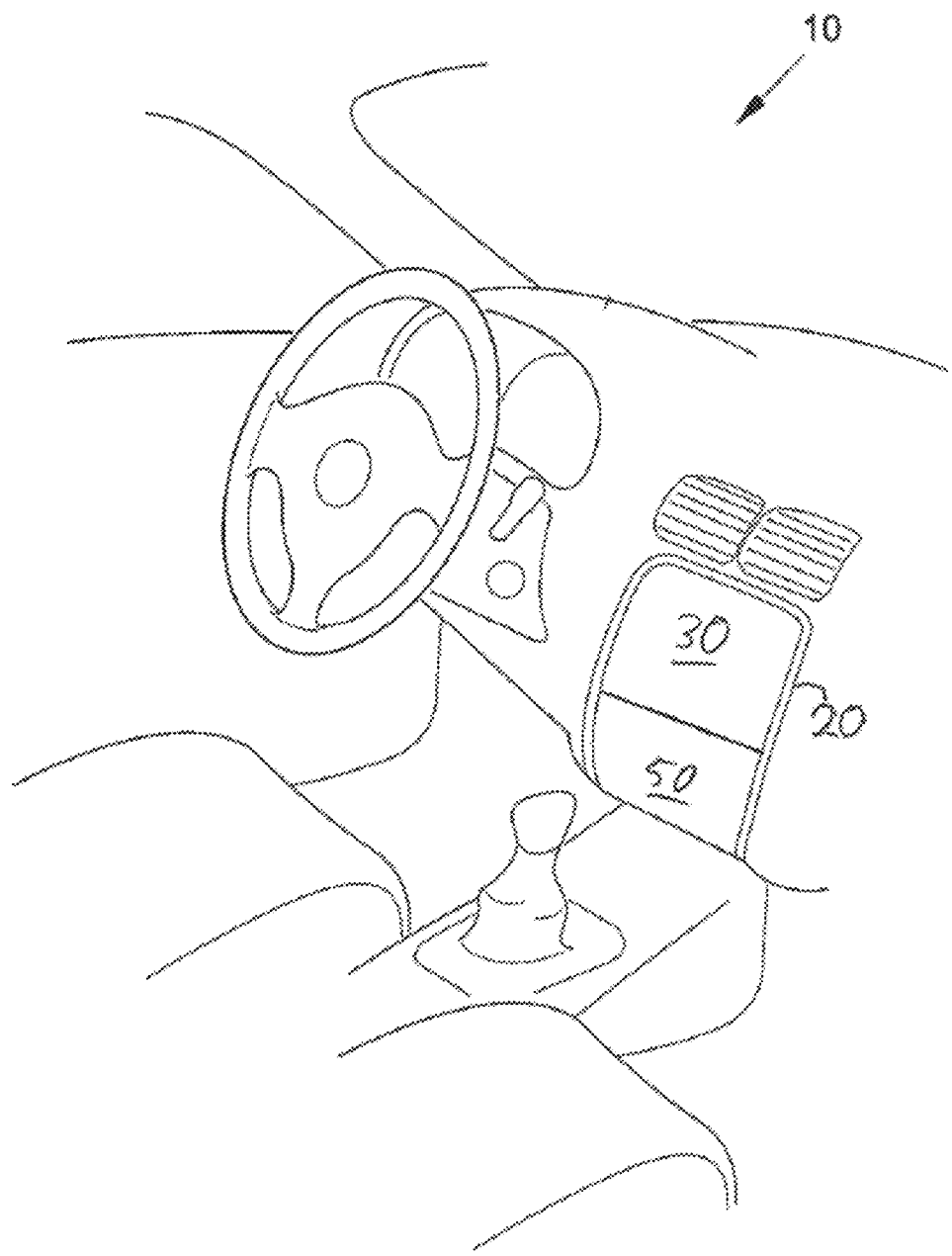
FIG. 1 shows a cockpit of a transportation vehicle with an infotainment system.

For the operation of a multi-zone air conditioning device that is installed in the transportation vehicle, an operating unit is often provided with a plurality of operating elements. These include two or more temperature adjusters for the selection of the desired temperature in the respective zones. Often, further different operating elements are provided, with which the air flow of the ventilation can be adjusted. If an automatic climate control system is provided, a sync button is also installed that is provided for simultaneous displacement of the temperature adjuster in the multi-zone air conditioning device. Temperature equalization between the different zones is provided by the climate control system while taking into account the adjusted values of the temperature adjusters. The function is a comfort feature and makes it superfluous to operate the different temperature adjusters separately to produce temperature equalization. If the synchronization mode is switched on, the temperature adjuster associated with the driver is usually used to select the temperature that is relevant for temperature control in all zones. If the synchronization mode is switched off, the different temperature zones are decoupled from each other, and each zone is individually controlled to the temperature value selected by the respective associated temperature adjuster.

A multi-zone climate control system for the climate control of an interior of a transportation vehicle is known from DE 10 2004 056 813 A1. The climate control system contains a main climate control module, a first and a second heat exchanger and a multi-zone module. The special feature consists of the arrangement of the main climate control module, the multi-zone module and the second heat exchanger.

A further multi-zone climate control system for the climate control of an interior of a transportation vehicle is known from EP 1 486 362 A2. In this case, the special feature is that an individual, climate control zone-specific air nozzle arrangement consisting of at least one air nozzle is provided for each individual climate control zone.

For different reasons, it can be necessary to reorganize the operating unit. The reasons include design reasons, lack of space, a desire for greater clarity and the desire for a different design concept, with which an impression of an intelligent (smart) system has greater priority.

Disclosed embodiments provide a different operating concept for the activation/deactivation of the synchronization mode for a multi-channel device. At the same time, the new operating concept is intended to permit highly fluid interaction and is intended to fit seamlessly into the control process.

Disclosed embodiments provide a method for operating a multi-channel device, a device for operating a multi-channel device, a computer program, and a transportation vehicle.

The proposed method for operating a multi-channel device has the following prerequisites: The multi-channel device comprises at least one first parameter adjuster for at least one first zone and at least one second parameter adjuster for at least one second zone. There are at least two different operating modes, wherein in a first operating mode the at least two different zones are controlled in common, wherein in the mode the first parameter adjuster is used as the main adjuster and the parameter selection thereof is used for control of the parameters in the at least two zones. In the second operating mode, the at least two different zones are controlled separately, in that the two parameter adjusters work individually.

The proposed method consists of exiting the first operating mode after actuating the second parameter adjuster and controlling the at least two different zones separately in the second operating mode. Furthermore, the method consists of exiting the second operating mode on further actuating the second parameter adjuster such that the selected parameter is brought into agreement with the parameter value that is selected by the first parameter adjuster, and controlling the at least two different zones in common again in the first operating mode.

By this method, the special button provided in the operating unit for switching on and switching off the synchronization mode can be saved. This also has the benefit that the space for the "sync button" can be used in another way, without having to omit the sync function, if only for design purposes. The operating process arranged in this way merges intuitively and automatically into the normal type of operation of the climate control system. A further benefit is that as a result the operation of the climate control system equates to an intelligent system that presents to the user as a smart/anticipatory system.

A further beneficial measure consists of continuous separate parameter control being carried out for the at least two different zones in the second operating mode on further actuation of the first parameter adjuster such that the adjusted parameter is brought into agreement with the parameter that is adjusted by the second parameter adjuster, wherein the parameter selection of the first parameter adjuster is used for control of the parameter in the first zone and the parameter selection for the second parameter adjuster is used for control of the parameter in the second zone. I.e., here there is not the same change back to the synchronization mode and frequent changes in the operating mode are avoided.

Another beneficial measure consists of carrying out the synchronization operating mode as a preadjusted standard function after starting operation of the multi-channel device.

The disclosed embodiments can be used for a multi-zone air conditioning device of a transportation vehicle, wherein the parameter to be controlled can correspond to the temperature in the different zones, wherein suitable temperature adjusters are used as the parameter adjusters. The temperature control is an important comfort function of a climate control system.

To implement the comfort rapidly, it is beneficial if starting the operation of the multi-zone air conditioning device is carried out by switching on the power supply, by starting the engine of the transportation vehicle or by starting the route for a navigation function.

For a device for operating a multi-channel device, it is beneficial if the device is arranged for carrying out the disclosed method, wherein the device comprises at least two parameter adjusters and at least one display unit for displaying the adjusted parameter values.

In a further beneficial way, the device can be embodied as part of an infotainment system for a transportation vehicle.

For the computer program that is also claimed, the corresponding benefits apply as with the claimed operations of the method when the computer program is arranged for carrying out the method according to any one of the preceding claims. The same also applies to the disclosed transportation vehicle, which is fitted with a corresponding device.

Exemplary embodiments are represented in the drawings and are described in detail below using the figures.

The present description illustrates the principles of the disclosure. It is thus understood that skilled persons are able to conceive of different arrangements that are indeed not explicitly described here, but which embody principles of the disclosure and that shall also be protected within the scope thereof.

FIG. 1 shows the cockpit of a transportation vehicle. This shows a passenger transportation vehicle. However, any other vehicles can also be considered as the transportation vehicle. Examples of other vehicles are: buses, utility vehicles, especially trucks, agricultural machines, construction machines, motorcycles, railway vehicles, etc. The disclosed embodiments would, in general, be usable with agricultural vehicles, railway vehicles and aircraft.

In FIG. 1, a cockpit of a transportation vehicle 10 is represented, which is fitted with a device for operating an infotainment system 20 according to an exemplary embodiment. Using the infotainment system 20, different functions of the transportation vehicle 10 can be operated. For example, with the device 20 a radio, a navigation system, playing stored pieces of music, a climate control system, other electronic devices or other comfort functions or applications of the transportation vehicle 10 can be controlled. The combination of all the components is also known by the term "infotainment system". An infotainment system denotes in transportation vehicles, especially passenger transportation vehicles, the amalgamation of car radio, navigation system, hands-free device, driver assistance systems and other functions in a central operating unit. The term infotainment is a portmanteau word combined from the words information and entertainment. The device for operating an infotainment system 20 comprises a display device in the region of a central console of the transportation vehicle 10, such as touch-sensitive display screen 30, also referred to as a "touchscreen", wherein the display screen 30 can be easily seen and operated, especially by a driver of the transportation vehicle 10, but also by a passenger of the transportation vehicle 10. Below the display screen 30, a mechanical operating unit 50 is also provided, which also contains the operating elements for the multi-zone climate control system. For example, buttons, rotary controls or combinations thereof, such as, for example, rotary press button controls, are also disposed here.

Figure 2:
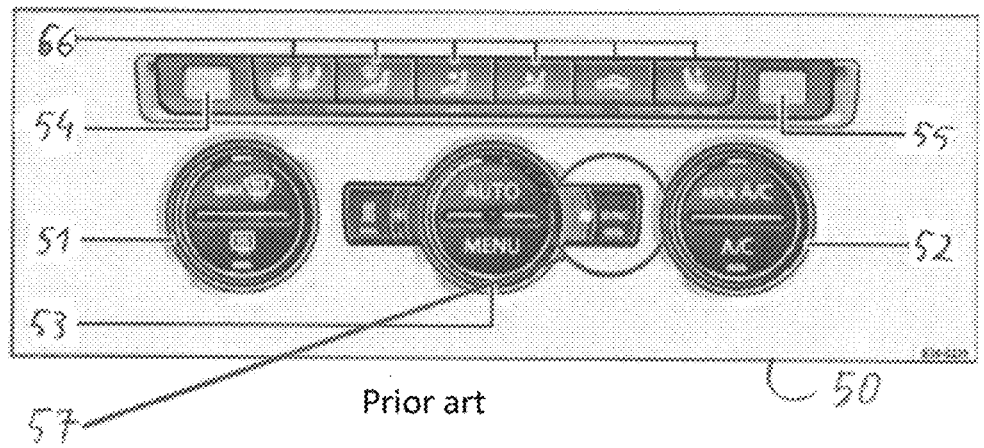
FIG. 2 shows the operating unit for a multi-zone air conditioning device.

FIG. 2 shows a typical form of the operating unit 50. The operating unit 50 is used exclusively for operating the multi-zone air conditioning device of the transportation vehicle 10. For this purpose, the operating unit 50 comprises a main operating element 53, with which the automatic operation of the climate control system can be switched on and switched off and can be operated with the different functions by one or more display screen menus, and different parameter settings can be carried out. For temperature adjustment, two temperature adjusters 51 and 52 are provided in the operating unit 50. The temperature adjuster 51 is associated with the driver's side and is intended to be operated by the driver. The temperature adjuster 52 is associated with the passenger's side and is intended to be operated by the passenger. Both temperature adjusters are embodied as rotary switches. If a 3 zone climate control system is installed, a further temperature adjuster is usually disposed in the rear. With a 4 zone climate control system, accordingly two further temperature adjusters are mounted in the rear. The further operating elements 54 to 56 are used for operating ventilation settings and adjustments of the seat heating. The prominent operating element 57 concerns the previously mentioned sync button, with which the synchronization mode can be switched on and switched off. It is just the button that should be omitted according to the disclosure. FIG. 2 therefore still corresponds to the solution as used according to the prior art.

Figure 3:
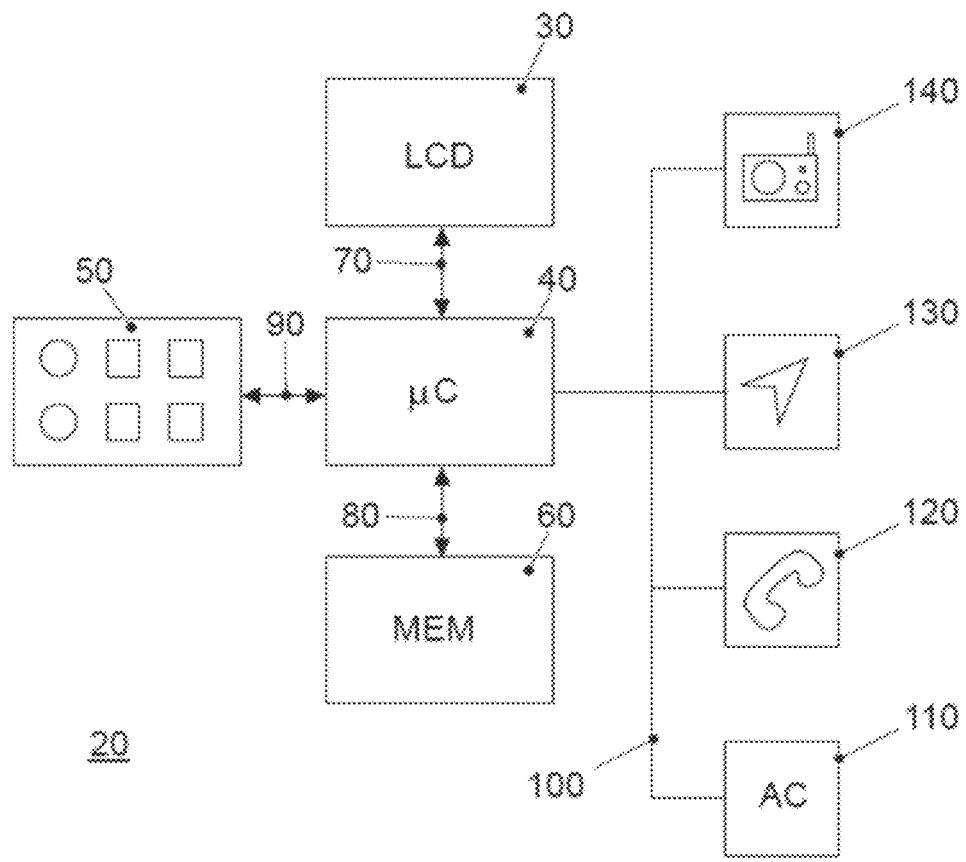
FIG. 3 shows a block diagram of an infotainment system.

FIG. 3 shows schematically a block diagram of the infotainment system 20 and by way of example some sub systems or applications of the infotainment system. The infotainment system 20 comprises the touch-sensitive display unit 30, a computing device 40, the operating unit 50 and a memory 60. The display unit 30 comprises both a display surface for displaying variable graphical information and a control surface (touch-sensitive layer) disposed above the display surface for inputting commands by a user.

The display unit 30 is connected to the computing device 40 by a data line 70. The data line can be designed according to the LVDS standard. The display unit 30 receives control data for actuating the display surface of the touchscreen 30 from the computing device 40 via the data line 70. Control data of the entered commands from the touchscreen 30 are also transmitted to the computing device 40 via the data line 70. The climate control system is operated by the operating unit 50.

Inputs can also be carried out by the touch-sensitive display screen 3, however. For the digital implementation of the operating mode, a program module that contains the algorithm of the touch-sensitive input method is executed by the computing device 40. The program module is stored in the memory device 60 and on activation of the corresponding menu item is loaded and is executed for inputting a parameter into the computing device 40. Implementation by a suitably programmed program module also applies to the other operating modes, in which the input of a different parameter is carried out in a corresponding way.

The memory device 60 is connected to the computing device 40 via a data line 80. A pictogram list or a list of symbols is stored in the memory 60, in which the corresponding pictogram or symbol is stored for each menu item.

The further parts of the infotainment system—radio 140, navigation unit 130, telephone 120 and multi-zone climate control system 110—are connected via the data bus 100 to the device 20 for operating the infotainment system. The high speed version of the CAN bus according to ISO Standard 11898-2 is considered as the data bus 100. Alternatively, for example, the use of a bus system based on Ethernet technology would also be considered. In addition, bus systems with which the data transmission takes place over optical fibers can be used. The MOST bus (Media Oriented System Transport) or the D2B Bus (Domestic Digital Bus) are mentioned as examples.

The disclosed operating method for operating the multi-zone air conditioning device 110 is described below using an exemplary embodiment represented in FIG. 4, in which the operation procedure is represented. The represented temperature displays are each shown on the display unit 30.

The example described concerns the operation of the climate control system of the transportation vehicle. This is also carried out by the infotainment system 20. For operation, the touch-sensitive display screen 30 is used to represent certain displays or operating menus. As a result, the operation is designed highly flexibly and the different devices—radio 140, navigation unit 130, telephone 120 and climate control system 110—can be operated. For this purpose, a selection menu can be displayed as the main menu, where the devices to be operated are represented or listed. The driver selects one of the devices and the main menu for the selected device appears on the LCD display screen 30. One menu item in the main menu of the climate control system is the setting of the desired temperature, in this case separately according to the driver's side and the passenger's side.

Figure 4:
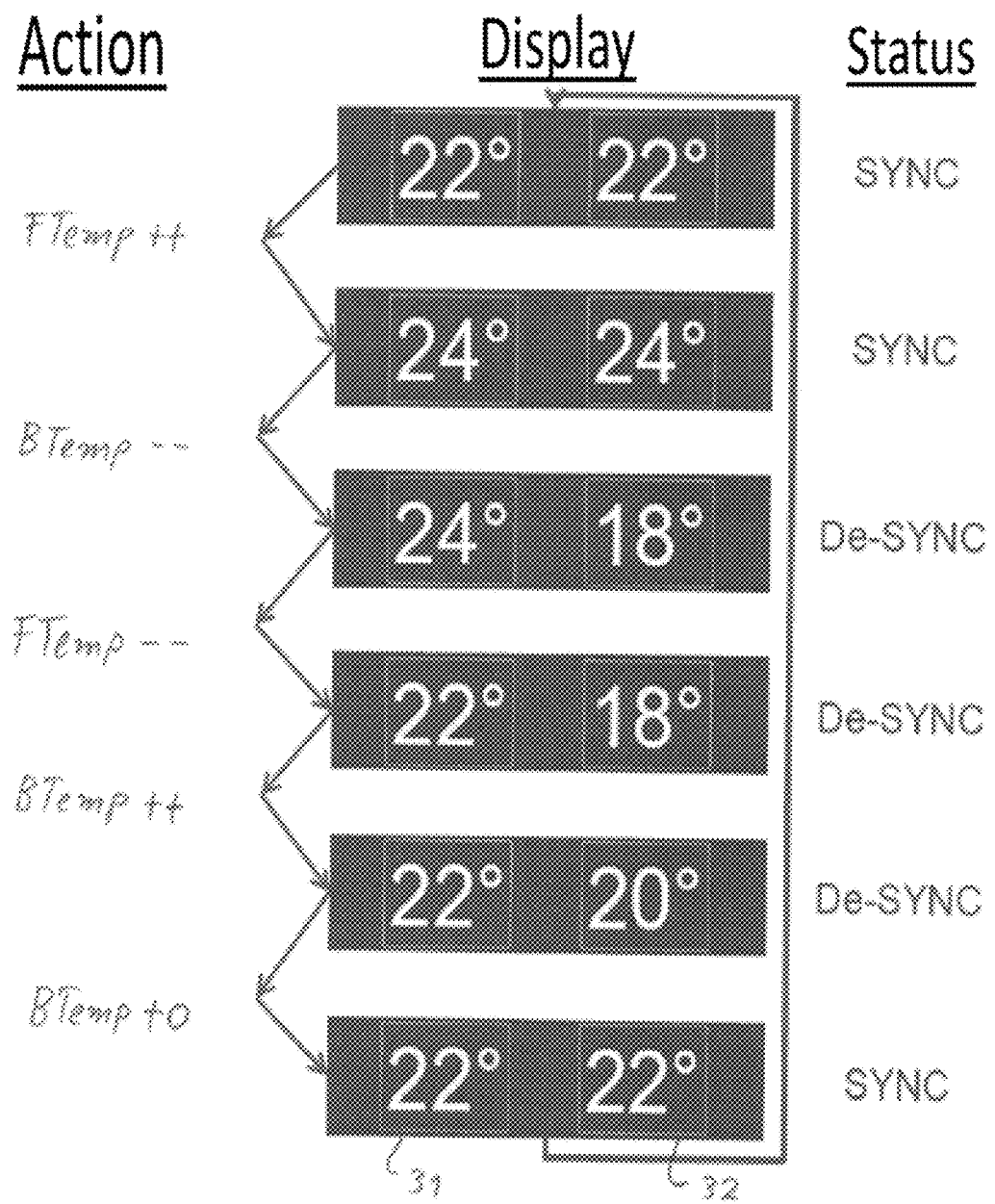
FIG. 4 shows the procedure of the method for operating the multi-zone air conditioning device.

The procedure of the operating process starts at the top in FIG. 4 and runs from the top down. The procedure is also shown as block diagram 150 in FIG. 5. At the start of the process, the climate control system is operating in the synchronization mode, see the indicator in the column "Status" and block 152 of FIG. 5. The operating mode is always automatically selected as the standard function after switching on the climate control system. The desired temperature for the driver's side is displayed on the left side in the "display" column in field 31. The desired temperature for the passenger's side is displayed in field 32 on the right side. The control process that is being carried out is now represented in the "Action" column. In the first operation "FTemp++" the driver increases the temperature from 22° to 24° Celsius. For this purpose, he actuates the temperature adjuster 51. In the "display" column it is shown that the increase in temperature is not only effective for the driver's side, but also for the passenger's side. I.e., in the synchronization mode the desired temperature is simultaneously increased by the operation to 24° for the passenger's side. In the next operation "BTemp−", as illustrated at block 154 of FIG. 5, the passenger reduces the temperature from 24° to 18° by actuating the temperature adjuster 52. The process is interpreted by the corresponding computer program, which assists the adjustment of the climate control system, such that the synchronization mode "Sync" is to be exited. The operating mode "De-Sync" with individual temperature control for the different climate control zones is initiated instead of this.

The computer program may be executed by the computing unit 40. During the execution, the program sends the corresponding commands for temperature adjustment in the different zones via the communications bus 100 to the multi-zone climate control system 110. Alternatively, the computer program can be executed in the climate control system 110 itself. The computing unit 40 will then send the values for the temperature adjustment received by the operating unit 50 to the climate control system 110 via the bus 100.

In the third operation "FTemp−", the driver reduces the temperature adjustment from 24° to 22°. The computer program assesses the operation so that individual control will continue to be used as the operating mode. The temperature adjustment on the passenger's side is therefore not affected by the operation. The "De-Sync" operating mode of the climate control system remains selected.

In the fourth operation "BTemp++", an increase in temperature from 18° to 20° is carried out by the passenger. As a result, individual temperature control is continued in the "De-Sync" operating mode.

Figure 5:
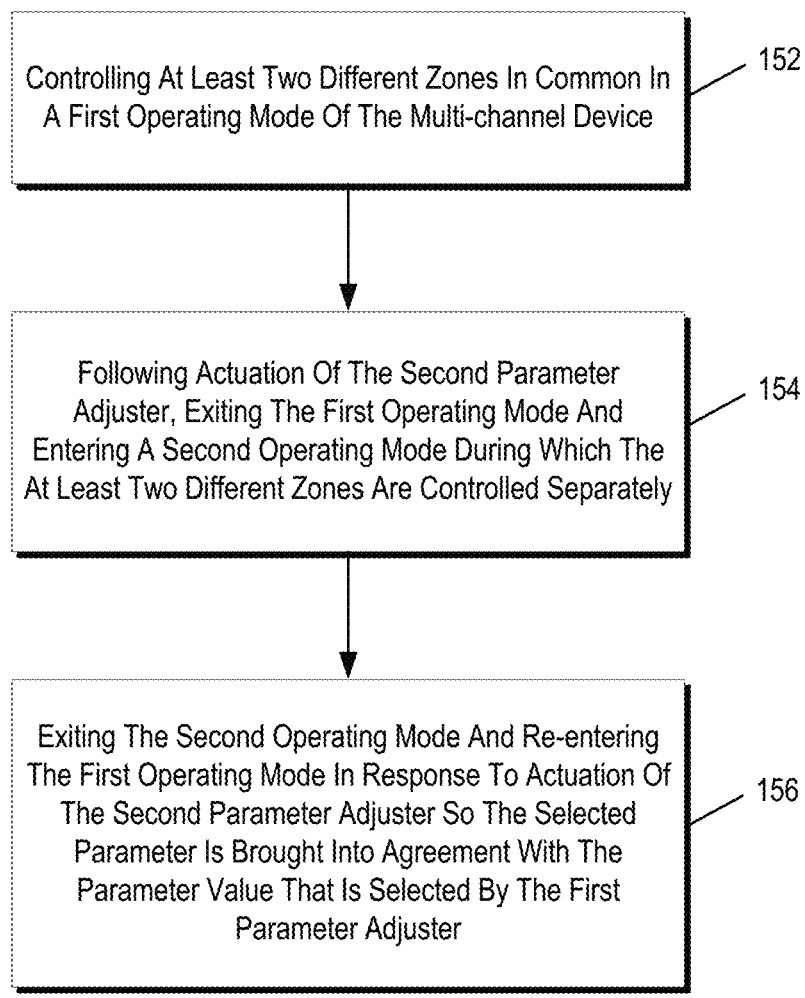
FIG. 5 shows a block diagram of the procedure of the method for operating the multi-zone air conditioning device.

In the final operation "BTemp+o", as illustrated at block 156 of FIG. 5, a further increase in temperature from 20° to 22° is carried out by the passenger. Since the newly adjusted desired temperature corresponds to the temperature adjustment on the driver's side, the temperature adjustment is so interpreted by the computer program such that the temperature control is to be continued in the "Sync" synchronization mode from then on. The further operations follow the schema as shown in FIG. 4 from the top down.

All examples mentioned herein as well as conditional wording are to be considered as not being limited to such specific examples. Thus, for example, it will be appreciated by those skilled in the art that the block diagram represented here represents a conceptual view of an example of circuitry. Similarly, it can be seen that a represented flow chart, state transition diagram, pseudocode and similar represent different versions for illustrating processes that can essentially be stored in computer-media and thus can be implemented by a computer or processor.

For the rapid achievement of comfort, it is beneficial if the start of the operation of the multi-zone air conditioning device by switching on the power supply, by starting the engine of the transportation vehicle or by starting the route for a navigation function is carried out in the synchronization mode. The navigation unit 130 is part of the infotainment system 20 and is connected to the climate control system 110 via the communications bus 100. Starting the route can be signaled to the climate control system 110 via the bus 100 by a navigation unit 130 with a corresponding message.

It should be understood that the proposed method and the associated devices can be implemented in different forms of hardware, software, firmware, special processors or a combination thereof. Special processors can contain application-specific integrated circuits (ASICs), Reduced Instruction Set Computers (RISC) and/or Field Programmable Gate Arrays (FPGAs). The proposed method and the device may be implemented as a combination of hardware and software. The software may be installed as an application program on a program memory device. Typically, this is a machine based on a computer platform comprising hardware, such as, for example, one or more central units (CPU), a direct access memory (RAM) and one or more input/output (I/O) interfaces. Moreover, an operating system is typically installed on the computer platform. The different processes and functions that have been described here can be part of the application program or a part that is implemented by the operating system.

The disclosure is not limited to the exemplary embodiments described here. There is room for different adaptations and modifications that the person skilled in the art would consider as also forming part of the disclosure because of his specialized knowledge.

Instead of for a multi-zone climate control system with suitable temperature control, the disclosed embodiments can be used for the control of other parameters, such as illumination intensity, sound volume, sound settings in audio devices, brightness settings in display units etc. and with other multi-channel devices such as multi-channel audio devices, multi-channel display devices or others. The term multi-channel device relates to the separate adjustment capability for different channels/branches/zones/elements. The term relates to multi-zone devices that offer separate adjustment capability for different zones/regions.

REFERENCE LIST 10 transportation vehicle
20 infotainment system
30 touch-sensitive display unit of infotainment system
31 first temperature display
32 second temperature display
40 microcomputer
50 input unit
51 first temperature adjuster
52 second temperature adjuster
53-56 further operating elements
57 sync button
60 memory unit
70 data line to the display unit
80 data line to the memory unit
90 data line to the input unit
100 data bus
110 climate control system
120 telephone
130 navigation unit
140 radio

The invention claimed is:

1. A device for operating a multi-channel device, the device comprising:
at least two parameter adjusters including at least one first parameter adjuster for at least one first zone, and at least one second parameter adjuster for at least one second zone; and
at least one display unit for display of the adjusted parameter values,
wherein the at least two different zones are controlled in common in a first operating mode of the multi-channel device, wherein the first parameter adjuster acts as the main adjuster and the parameter selection thereof is used for the control of the parameter in the at least two zones,
wherein following actuation of the second parameter adjuster the first operating mode is exited and the at least two different zones are controlled separately in a second operating mode, wherein the parameter selection of the second parameter adjuster is used for the control of the parameter in the second zone,
wherein, on further actuating the second parameter adjuster so the selected parameter is brought into agreement with the parameter value that is selected by the first parameter adjuster, the second operating mode is exited and the at least two different zones are again controlled in common in the first operating mode.

2. The device of claim 1, wherein in the second operating mode, on further actuating the first parameter adjuster, the parameter selection of the first parameter adjuster is only used for the control of the parameter in the first zone.

3. The device of claim 1, wherein in the second operating mode, on further actuating the first parameter adjuster so the adjusted parameter is brought into agreement with the parameter that is adjusted by the second parameter adjuster, continuing separate parameter control of the two different zones is carried out, wherein the parameter selection of the first parameter adjuster is used for control of the parameter in the first zone and the parameter selection of the second parameter adjuster is used for control of the parameter in the second zone.

4. The device of claim 1, wherein the common control of the at least two zones corresponds to a synchronization operating mode of the multi-channel device, in which alignment of the parameter control in the at least two zones is carried out, such that the parameter control for the second zone is carried out so the parameter value selected by the first parameter adjuster is used as the setpoint value.

5. The device of claim 4, wherein the synchronization operating mode is carried out as a pre-adjusted standard function after starting the operation of the multi-channel device.

6. The device of claim 1, wherein the multi-channel device corresponds to a multi-zone climate control device of a transportation vehicle and the parameter to be controlled corresponds to the temperature in the different zones, wherein a suitable temperature adjuster is used as the parameter adjuster.

7. The device of claim 6, wherein starting the operation of the multi-zone air conditioning device is carried out by switching on the power supply, by starting the engine of the transportation vehicle or by starting the route for a navigation function.

8. The device of claim 1, wherein the device is part of an infotainment system for a transportation vehicle.

9. A non-transitory computer readable medium including a computer program comprising program operations that carry out a method of operating a multi-channel device when the operations are executed in a computing unit, the method comprising:
controlling at least two different zones in common in a first operating mode of the multi-channel device, wherein the at least two different zones include at least one first zone having at least two parameter adjusters including at least one first parameter adjuster for the at least one first zone, and the at least two different zones include at least one second zone having at least one second parameter adjuster for the at least one second zone;
the first parameter adjuster acting as a main adjuster;
using parameter selection of the first parameter adjuster for control of the parameter in the at least two zones;
following actuation of the second parameter adjuster, exiting the first operating mode and entering a second operating mode during which the at least two different zones are controlled separately, wherein the parameter selection of the second parameter adjuster is used for the control of the parameter in the at least one second zone; and
exiting the second operating mode and re-entering the first operating mode in response to actuation of the second parameter adjuster so the selected parameter is brought into agreement with the parameter value that is selected by the first parameter adjuster, wherein, in the second operating mode, the at least two different zones are again controlled in common in the first operating mode.

10. The computer readable medium of claim 9, wherein in the second operating mode, on further actuating the first parameter adjuster, the parameter selection of the first parameter adjuster is only used for the control of the parameter in the first zone.

11. The computer readable medium of claim 9, wherein in the second operating mode, on further actuating the first parameter adjuster so the adjusted parameter is brought into agreement with the parameter that is adjusted by the second parameter adjuster, continuing separate parameter control of the two different zones is carried out, wherein the parameter selection of the first parameter adjuster is used for control of the parameter in the first zone and the parameter selection of the second parameter adjuster is used for control of the parameter in the second zone.

12. The computer readable medium claim 9, wherein the common control of the at least two zones corresponds to a synchronization operating mode of the multi-channel device, in which alignment of the parameter control in the at least two zones is carried out, such that the parameter control for the second zone is carried out so the parameter value selected by the first parameter adjuster is used as the setpoint value.

13. The computer readable medium claim 12, wherein the synchronization operating mode is carried out as a pre-adjusted standard function after starting the operation of the multi-channel device.

14. The computer readable medium of claim 9, wherein the multi-channel device corresponds to a multi-zone climate control device of a transportation vehicle and the parameter to be controlled corresponds to the temperature in the different zones, wherein a suitable temperature adjuster is used as the parameter adjuster.

15. The computer readable medium claim 14, wherein starting the operation of the multi-zone air conditioning device is carried out by switching on the power supply, by starting the engine of the transportation vehicle or by starting the route for a navigation function.

16. A method for operating a multi-channel device that includes at least one first parameter adjuster for at least one first zone, and at least one second parameter adjuster for at least one second zone, the method comprising:
controlling at least two different zones in common in a first operating mode of the multi-channel device, wherein the at least two different zones include the at least one first zone having at least two parameter adjusters including the at least one first parameter adjuster for the at least one first zone, and the at least two different zones include the at least one second zone having the at least one second parameter adjuster for the at least one second zone;
the first parameter adjuster acting as a main adjuster;
using parameter selection of the first parameter adjuster for control of the parameter in the at least two zones;
following actuation of the second parameter adjuster, exiting the first operating mode and entering a second operating mode during which the at least two different zones are controlled separately, wherein the parameter selection of the second parameter adjuster is used for the control of the parameter in the at least one second zone; and
exiting the second operating mode and re-entering the first operating mode in response to actuation of the second parameter adjuster so the selected parameter is brought into agreement with the parameter value that is selected by the first parameter adjuster, wherein, in the second operating mode, the at least two different zones are again controlled in common in the first operating mode.

17. The method of claim 16, wherein in the second operating mode, on further actuating the first parameter adjuster, the parameter selection of the first parameter adjuster is only used for the control of the parameter in the first zone.

18. The method of claim 16, wherein in the second operating mode, on further actuating the first parameter adjuster so the adjusted parameter is brought into agreement with the parameter that is adjusted by the second parameter adjuster, continuing separate parameter control of the two different zones is carried out, wherein the parameter selection of the first parameter adjuster is used for control of the parameter in the first zone and the parameter selection of the second parameter adjuster is used for control of the parameter in the second zone.

19. The method of claim 16, wherein the common control of the at least two zones corresponds to a synchronization operating mode of the multi-channel device, in which alignment of the parameter control in the at least two zones is carried out, such that the parameter control for the second zone is carried out so the parameter value selected by the first parameter adjuster is used as the setpoint value.

20. The method of claim 19, wherein the synchronization operating mode is carried out as a pre-adjusted standard function after starting the operation of the multi-channel device.

21. The method of claim 16, wherein the multi-channel device corresponds to a multi-zone climate control device of a transportation vehicle and the parameter to be controlled corresponds to the temperature in the different zones, wherein a suitable temperature adjuster is used as the parameter adjuster.

22. The method of claim 21, wherein starting the operation of the multi-zone air conditioning device is carried out by switching on the power supply, by starting the engine of the transportation vehicle or by starting the route for a navigation function.

* * * * *